United States Patent
Araújo et al.

(10) Patent No.: US 11,789,535 B2
(45) Date of Patent: *Oct. 17, 2023

(54) TRANSMISSION OF HAPTIC INPUT

(71) Applicant: Telefonaktiebolaget LM Ericsson (publ), Stockholm (SE)

(72) Inventors: José Araújo, Stockholm (SE); Lars Andersson, Solna (SE); Bengt Lindoff, Bjärred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,094

(22) Filed: Aug. 23, 2021

(65) Prior Publication Data

US 2021/0382556 A1 Dec. 9, 2021

Related U.S. Application Data

(63) Continuation of application No. 16/477,665, filed as application No. PCT/EP2017/051048 on Jan. 19, 2017, now Pat. No. 11,126,264.

(51) Int. Cl.
*G06F 3/01* (2006.01)
*H04L 67/10* (2022.01)

(52) U.S. Cl.
CPC .............. *G06F 3/016* (2013.01); *H04L 67/10* (2013.01)

(58) Field of Classification Search
CPC ................................. G06F 3/016; H04L 67/10
See application file for complete search history.

(56) References Cited

U.S. PATENT DOCUMENTS

| 8,386,959 B2 | 2/2013 | Rohrabaugh et al. |
| 2009/0225046 A1 | 9/2009 | Kim et al. |

(Continued)

FOREIGN PATENT DOCUMENTS

| JP | 2015064841 A | | 3/2015 |
| JP | 2015064841 A | * | 4/2015 |
| JP | 2015064841 A | | 4/2015 |

OTHER PUBLICATIONS

Sugaya, "Screen Sharing Terminal, Screen Sharing Method, Program for Screen Sharing" (English Translation of JP-2015064841-A) (Year: 2015).*

(Continued)

*Primary Examiner* — John T Repsher, III
(74) *Attorney, Agent, or Firm* — Leffler Intellectual Property Law, PLLC

(57) ABSTRACT

A tactile telecommunications device comprising: a tactile device configured to receive input of tactile data and to output tactile data, said tactile device being associated with tactile device properties; a communications interface configured for establishing a connection with a second tactile telecommunications device, said second tactile telecommunications device comprising a second tactile device being associated with tactile device properties; a memory configured for storing said tactile device properties; and a controller configured to: receive said tactile device properties for said second tactile device; determine a common property by comparing said tactile device properties for said tactile device and said tactile device properties for said second tactile device; determine whether an adaptation is required, and if so, adapt operation of said tactile device accordingly.

8 Claims, 5 Drawing Sheets

(56) References Cited

U.S. PATENT DOCUMENTS

| | | | | |
|---|---|---|---|---|
| 2011/0221694 A1* | 9/2011 | Karaoguz | ............... | G06F 3/041 |
| | | | | 345/173 |
| 2012/0229400 A1* | 9/2012 | Birnbaum | ............... | G06F 3/016 |
| | | | | 345/173 |
| 2013/0076764 A1 | 3/2013 | Yada | | |
| 2014/0313142 A1 | 10/2014 | Yairi | | |
| 2016/0321882 A1 | 11/2016 | Mankowski | | |
| 2017/0277384 A1* | 9/2017 | Dent | ....................... | H04L 51/10 |
| 2018/0084362 A1 | 3/2018 | Zhang et al. | | |

OTHER PUBLICATIONS

Tactile | Define Tactile at Dictionary.com. (article) [online]. Dictionary.com. Archived Mar. 18, 2016. Retreived on Sep. 10, 2020. https://www.dictionary.com/browse/tactile (Year: 2016).*

English language Abstract of JP Patent Application Publication No. 2015064841 A published Apr. 9, 2015.

PCT International Search Report, dated Apr. 19, 2017, in connection with International Application No. PCT/EP2017/051048.

PCT Written Opinion, dated Apr. 19, 2017, in connection with International Application No. PCT/EP2017/051048.

Richard Moss, "Haptic technology: The next frontier in video games, wearables, virtual reality, and mobile electronics", Jan. 15, 2015, http://newatlas.com/haptic-tech-vr-wearables-games-sightlence/35616/, pp. 1-9.

John Gaudiosi, "Virtual Touch: Inside Technology That Makes VR Feel Real", Sep. 13, 2016, Rolling Stone, http://www.rollingstone.com/culture/features/virtual-touch-inside-technology-that-makes-vr-feel-real-w438867, pp. 1-10.

European Communication dated Aug. 11, 2020 in connection with European Application No. 17700829.9, 6 pages.

Tactile | Define Tactile at Dictionary.com (article) [online]. Dictionary.com. Archived Mar. 18, 2016. Retrieved on Sep. 10, 2020. https://www.dictionary.com/browse/tactile (Year: 2016).

PCT International Search Report, dated Apr. 19, 2017, in connection with International Application No. PCT/EP2017/051048, all pages.

PCT Written Opinion, dated Apr. 19, 2017, in connection with International Application No. PCT/EP2017/051048, all pages.

* cited by examiner

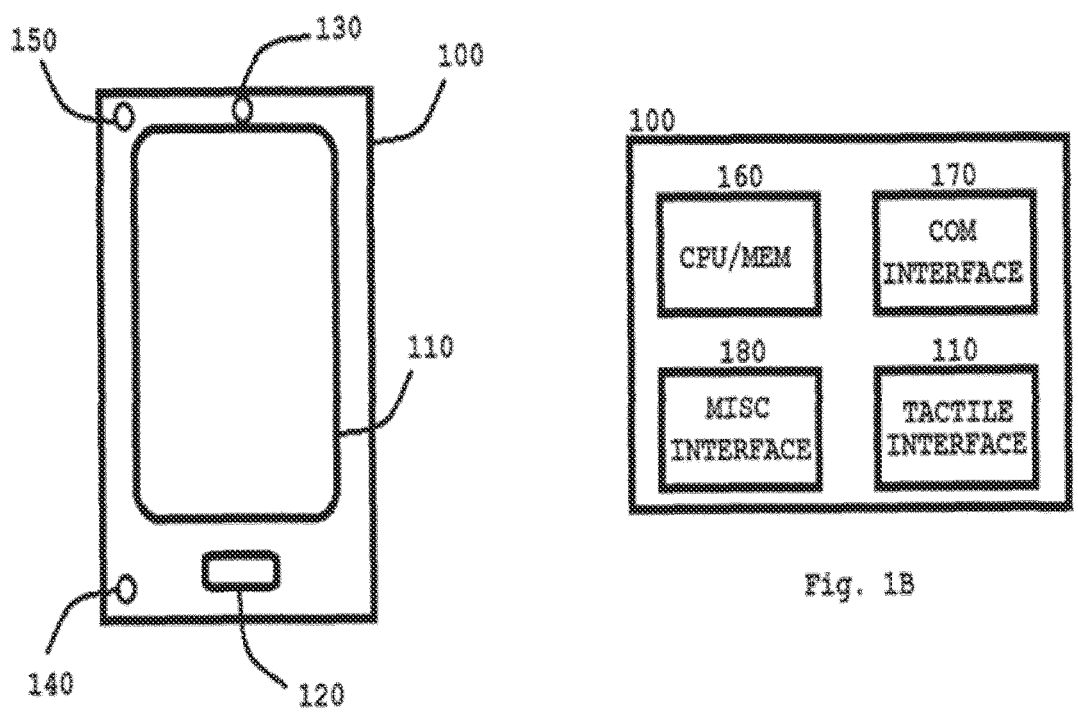
Fig. 1A
Fig. 1B
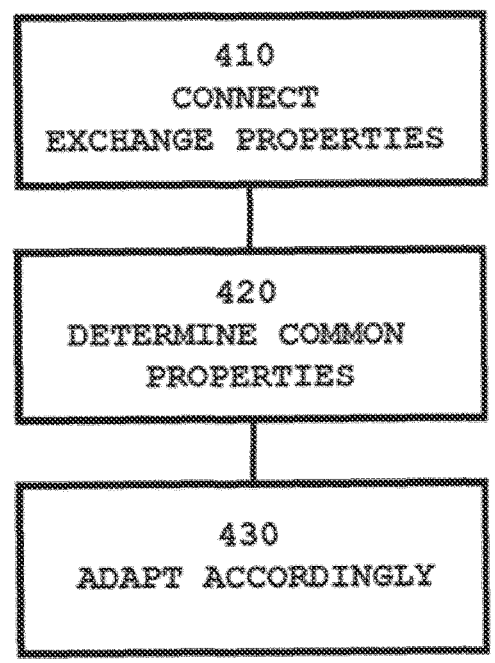
Fig. 4

TRANSMISSION OF HAPTIC INPUT

CROSS-REFERENCE TO RELATED APPLICATIONS

This application claims the benefit of U.S. application Ser. No. 16/477,665, filed Jul. 12, 2019 (371(c) date), which is a 371 National Stage Application of PCT/EP2017/051048, filed Jan. 19, 2017. Both of these earlier applications are hereby incorporated herein by reference in their entireties.

TECHNICAL FIELD

This application relates to a tactile telecommunications device, a method and a computer-readable storage medium for improved transmission of tactile input.

BACKGROUND

Haptic, such as tactile or kinaesthetic, communication recreates the sense of touch by applying forces, vibrations, or motions to the user, which is commonly known as the tactile internet. This physical stimulation can be used to assist in the creation of virtual objects in a computer simulation, to control such virtual objects, and to enhance the remote control of machines and devices. Tactile devices may incorporate tactile sensors that measure forces exerted by the user on a user interface such as a tactile display. There are two sensory systems related to sense of touch in humans: kinesthetic and tactile/cutaneous. For the purpose of this application they will all be referred to as being haptic and will be associated with active touch to communicate or recognize objects.

The haptic/tactile internet is seen as the next step in mobile networking. Users are currently able to efficiently communicate over voice and video, but in the future networked society it is envisioned that people will be able to communicate the sense of touch via haptic devices. In the past years, there has been a large amount of research on devices which allow such communication to take place. Several new tactile devices are being developed, particularly ones that are able to be worn by the user such as gloves, vests, but also integrated in smartphones and smartwatches. New low cost mobile haptic devices, are currently being developed by several companies such as Microsoft (NormalTouch and Texture Touch), Neurodigital (GloveOne), Tactai (Tactai Touch) for augmented reality and virtual reality applications. Various tactile actuator technology are also being used such as ultrasound (e.g. ultrahaptics), vibrotactile (e.g. Apple's Macbook), electrostatic, piezoelectric (e.g. TPad smartphone) and mechanical (e.g., MIT's Inform 3D displays).

With the advent of the 5G (fifth generation) telecommunications systems, it is envisioned that many telecommunication devices will be provided with tactile input and/or output means, such as tactile displays.

As is known, many different kind of telecommunication devices exist today, such as smartphones, internet tablets, gaming devices, and (laptop) computers to mention a few. All these have different physical characteristics, both between the categories and also inside each category. For example, smartphones are available in all different sizes, having a wide range of differently sized displays available.

Several solutions for handheld devices consider the interaction with a user interface (buttons, sliders, etc.) or they provide tactile feedback with respect to the image which is being displayed in the device's touchscreen. In other use cases, two users using a tactile device may transmit the sense of touch to each other by interacting with the display in real-time. Each user receives tactile feedback with respect to the tactile properties (e.g. texture, friction, stiffness) of the user interface, image, object or the other user's finger on a specific location since the device is capable of tracking the user's finger position. The TPad smartphone is the first tactile smartphone and has been commercialized by a US startup since 2015. The phone is built upon a Motorola android phone with a piezoelectric actuated screen on top of it, which is able to generate various friction and texture effects via vibration.

The inventors of the inventions to be discussed herein, has, after insightful and inventive reasoning, envisioned and realized that there will be a problem in communicating tactile input/output, from hereafter called tactile data, as one tactile telecommunications device (a telecommunications device arranged with tactile input and/or output means) may not have the same type of tactile device. Especially, if a tactile display is used, there may be a difference in size of the tactile device of two tactile telecommunications devices communicating with one another. Tactile input received on one device may then be distorted when being presented on the second tactile telecommunications devices.

Consider the case where two users A and B want to perform tactile or tactile communications with each other using a mobile device (e.g. smartphone, tablet, smartwatch, etc.), where each devices is able to provide tactile feedback to each user, when the user touches the display with its fingers.

In one scenario, user A may place its finger on top of its device's display, and the finger of user A is to be "tactically rendered" in user's B display, so that user B can feel the finger of user A. Similarly, users may be interacting via a game (e.g., users can perceive each other's touches and their joint interaction when manipulating objects) or may be performing remote teaching (e.g. user A teaching user B how to write).

The methods in the art do not consider the definition and indication of which regions of the device's display are enabled for tactile exploration or not, when performing tactile communications. This may be acceptable if the devices used by user A and user B are identical with respect to their dimensions and tactile feedback capabilities. However, handheld devices in the market usually have different dimensions and capabilities. Particularly, as discussed above, the smartphone, tablet and table devices currently available in the market have different dimensions as they cater for different users and applications. Moreover, users tend to hold and interact with their devices in different ways, for example, users switch from holding a device in landscape to holding it in portrait mode, or vice versa. When the devices of user A and B have different sizes and user A uses an area of device A which cannot be mapped into device B due to the size difference, then user B will not be able to receive the input from user A, at least not without the tactile data being distorted. This issue greatly reduces the user experience and the efficiency in tactile communications. Additionally, using the solutions in the art, no savings with respect to tactile actuation are achieved by taking into account that certain device regions are unable to provide tactile feedback, according to the user input.

To some degree, these problems resemble those of displaying web pages on internet devices having differently sized screens. In one type of such systems, the content to be displayed is scaled to fit the receiving display. In one type of such systems, the content to be displayed is rearranged to fit the receiving display. And in one type of such systems, the content to be displayed is adapted by having some elements fixed in size, while some items are scaled and/or rearranged to fit the receiving display.

As tactile data comprises both a location and a touch, such scaling is not possible without distorting the tactile data. Also, rearranging the tactile data will lead to a distortion of the tactile data, rendering it incorrect, with respect to location and/or size.

In view of the problems and shortcomings indicated above, there is a need for an improved manner of transmitting tactile data from one tactile telecommunications device to another tactile telecommunications device having different tactile output properties.

SUMMARY

The inventors of the present invention have realized, after inventive and insightful reasoning that there are envisioned problems as more and more tactile devices come to the market as discussed above and below.

This invention proposes a method to infer and display tactile or tactile exploration and non-exploration regions in display devices with tactile feedback capabilities when performing tactile communication between multiple users. Based on the exchange of the devices properties and poses, such as orientation, the proposed method and apparatus calculates the device's regions where tactile feedback should be enabled and the regions where tactile feedback should be disabled. Finally, an efficient indication of such regions is provided to each user.

It is therefore an object of the teachings of this application to overcome or at least mitigate one or more of the problems and shortcomings listed above and below by providing a tactile telecommunications device, the tactile telecommunications device comprising: a tactile device configured to receive input of tactile data and to output tactile data, said tactile device being associated with tactile device properties; a communications interface configured for establishing a connection with a second tactile telecommunications device, said second tactile telecommunications device comprising a second tactile device being associated with tactile device properties; a memory configured for storing said tactile device properties; and a controller configured to: receive said tactile device properties for said second tactile device; determine a common property by comparing said tactile device properties for said tactile device and said tactile device properties for said second tactile device; determine whether an adaptation is required, and if so, adapt operation of said tactile device accordingly.

It is also an object of the teachings of this application to overcome or at least mitigate one or more of the problems and shortcomings listed above and below by providing a method for use in a method of controlling a tactile telecommunications device (100), the tactile telecommunications device comprising: a first tactile device for receiving input of tactile data and outputting tactile data, said first tactile device being associated with tactile device properties; wherein the method comprises: receiving tactile device properties for a second tactile device; determining a common property by comparing tactile device properties for said first tactile device and said tactile device properties for said second tactile device; determining whether an adaptation is required, and if so, adapting operation of said first tactile device accordingly It is moreover an object of the teachings of this application to overcome one or more of the problems and shortcomings listed above by providing a computer readable storage medium encoded with instructions that, when executed on a processor, perform the method referred to above.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which:

FIG. 1A shows a schematic overview of a tactile telecommunications device according to one embodiment of the teachings of this application;

FIG. 1B shows a schematic overview of the components of a tactile telecommunications device according to one embodiment of the teachings of this application;

FIG. 4 shows a flowchart for a general method of controlling a telecommunications device according to the teachings herein;

DETAILED DESCRIPTION

Figure 2A:
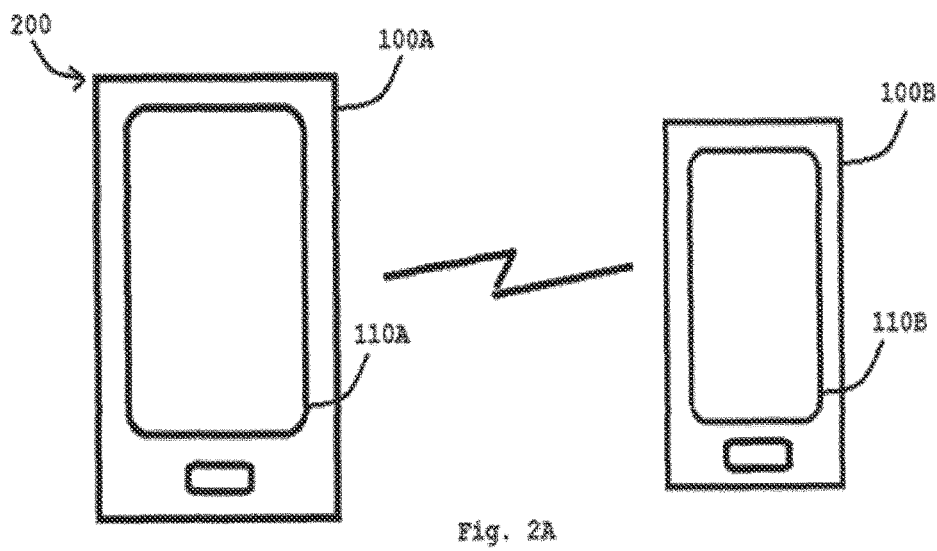
FIG. 2A shows a schematic view of an example tactile telecommunications device system according to one embodiment of the teachings of this application.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

FIG. 1A shows a schematic overview of tactile telecommunications device 100 according to one embodiment of the present invention. The tactile telecommunications device may be a robotic tool, a smartwatch, a smartphone, an internet tablet, a gaming device, or a (laptop) computer. In the following the tactile telecommunications device will be exemplified as being an internet tablet 100.

The tactile telecommunications device 100 comprises a tactile device 110 being able to output and/or receive tactile data. On example of such a tactile device is a tactile display 110.

The tactile display 110 may be a touch display where a portion is arranged for receiving input of tactile data and for outputting tactile data. For the purpose of this application, the tactile display 110 of such an embodiment, the tactile display will be regarded as the portion of a touch display that is arranged for portion is arranged for receiving input of tactile data and for outputting tactile data.

The tactile display 110 is used as a touch sensitive display where a user provides input by touching the screen, however, not only the location of the touch is comprised in the received tactile data, but also the kind of touch, such as the pressure, the size of the touch and possibly also the texture or roughness (friction) of the touch. To output such tactile data, the tactile display is changed to purvey the kind of touch at the location of the touch. It should be noted that through out this application tactile and tactile will be used interchangeably, but seem to refer to the same manner of providing tactile data, namely input/output that can be felt at a specific location.

The tactile telecommunications device 100 may also comprise other input means such as one or several buttons or keys 120, being virtual and/or physical, perhaps part of a traditional touch display. As a skilled person would understand, many options exist and this application will not go into detail about all possible combinations, but only give an example of one button 120, but it should be understood that many variations exist and are all considered to be represented by the button 120.

The tactile telecommunications device 100 may also comprise a loudspeaker 130 and a microphone 140 for providing and receiving sound, such as voice data, possibly comprising voice commands.

The tactile telecommunications device 100 may also comprise a camera 150 for receiving image data, such as video data, possibly comprising touchless commands.

FIG. 1B shows a schematic view of the components of a tactile telecommunications device 100 according to one embodiment of the present invention, such as the tactile telecommunications device 100 of FIG. 1A.

The tactile telecommunications device 100 comprises a tactile interface 110 as discussed in relation to FIG. 1A. The tactile telecommunications device 100 also comprises a controller 160. The controller 160 may be implemented using instructions that enable hardware functionality, for example, by using executable computer program instructions in a general-purpose or special-purpose processor that may be stored on a computer readable storage medium (disk, memory etc) to be executed by such a processor. The controller and memory is referenced CPU/MEM in FIG. 1B. The controller 160 is configured to read instructions from the memory and execute these instructions to control the operation of the tactile telecommunications device 100. The controller 160 may be implemented using any suitable, publically available processor or Programmable Logic Circuit (PLC). The memory may be implemented using any commonly known technology for computer-readable memories such as ROM, RAM, SRAM, DRAM, FLASH, DDR. SDRAM or some other memory technology.

The tactile telecommunications device 100 also comprises a communications interface 170 for communicating with other devices. Such interfaces may be wireless, such as a telecommunications interface according to 4G or 5G telecommunications standards. The interface 170 may also be wired arranged for internet communication, such as TCP/IP or other device communication standards.

The tactile telecommunications device 100 may also comprise other interfaces (MISC INTERFACE) such as keypads, buttons, microphones, cameras etc for receiving user input through, here referred to collectively as 180.

FIG. 2A shows a tactile telecommunications system 200 comprising a first tactile telecommunications device 100A and a second tactile telecommunications device 100B. As would be apparent to a skilled reader, the tactile telecommunications system 200 may also comprise other devices/arrangements for implementing a telecommunications standard. For illustrative purposes, such other devices/arrangements have been left out, focusing only on the two tactile telecommunications devices 100A, 10B communicating with one another.

The first tactile telecommunications device 100A is connected to the second tactile telecommunications device 100B through a connection according to the applicable communications standard, as is illustrated by the zigzag arrow.

As is also illustrated, the tactile device 110A of the first tactile telecommunications device 100A has different properties than the tactile device 110B of the second tactile telecommunications device 100B. In the illustrated example, the tactile devices 110A, 110B are tactile displays and the properties are represented by the sizes of the tactile displays 110A, 110B, the first tactile display 110A having a larger size than the second tactile display 110B.

Figure 2B:
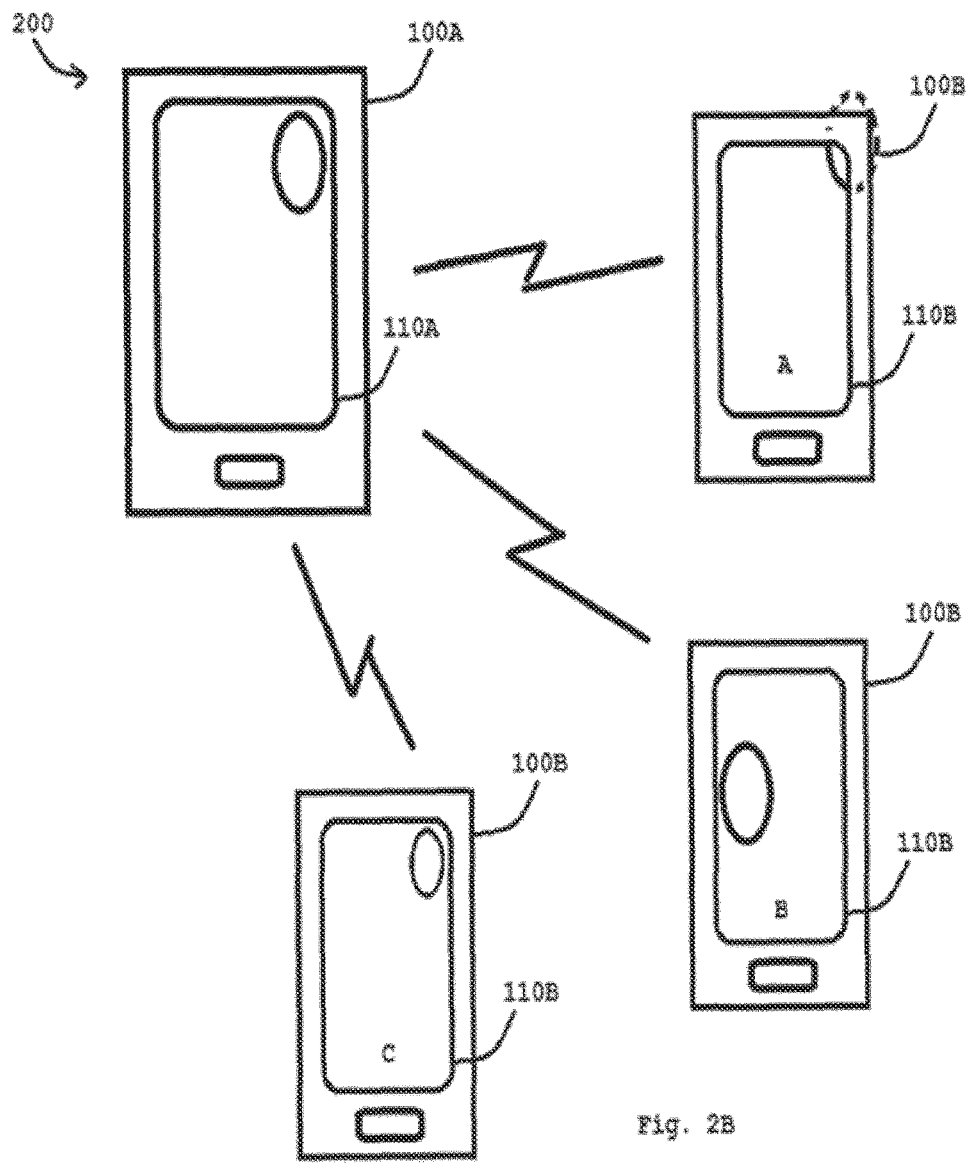
FIG. 2B shows a schematic view of an example tactile telecommunications device experiencing envisioned problems according to an aspect of the teachings of this application.

FIG. 2B illustrates the envisioned problems. As the first tactile telecommunications device 100A receives a tactile input (represented by the oval), the location and the kind of touch is received and transmitted to the second tactile telecommunications device 110B. In this example there are three different second tactile telecommunications devices 110B each arranged to handle the incoming tactile data in different manner.

One second tactile telecommunications device 100B (case A) is arranged to simply display or output the tactile data as it is received. This may lead to that some of the data does not fit in the display area of the second tactile display 110B and information is lost, as is indicated by the dashed oval.

One second tactile telecommunications device 100B (case B) is arranged to rearrange the tactile output, thus displaying or outputting the tactile data on the counterpart of the next row as if the display coordinates simply wrapped around. This leads to that some of the data is outputted at the incorrect location, thereby distorting the tactile data.

One second tactile telecommunications device 100B (case C) is arranged to simply scale the tactile output, thus display or output the tactile data at a corresponding position and at a corresponding size. However, this leads to that the distances between two inputs or the distance travelled by one input will not match and neither will the size of the touch, thereby distorting the tactile data.

However, the inventors of the present invention has realized and envisioned this problem and come up with an elegant solution that is easy to implement and which will work on all types of variations of tactile device sizes.

The solution is based on that as the first and second tactile telecommunications devices 100A, 100B connect to one another, they exchange properties for their corresponding tactile displays 110. This enables the tactile telecommunications devices (one or both) to adapt to the other tactile telecommunications device and only allow input that will fit the other tactile telecommunications device.

Figure 3A:
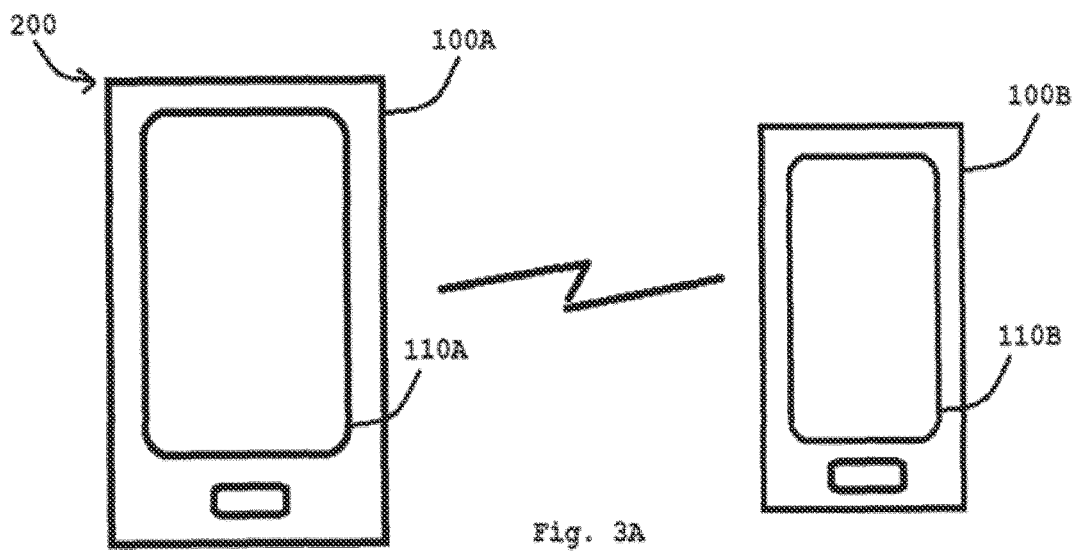
FIG. 3A shows a schematic view of an example tactile telecommunications device system according to one embodiment of the teachings of this application.
Figure 3B:
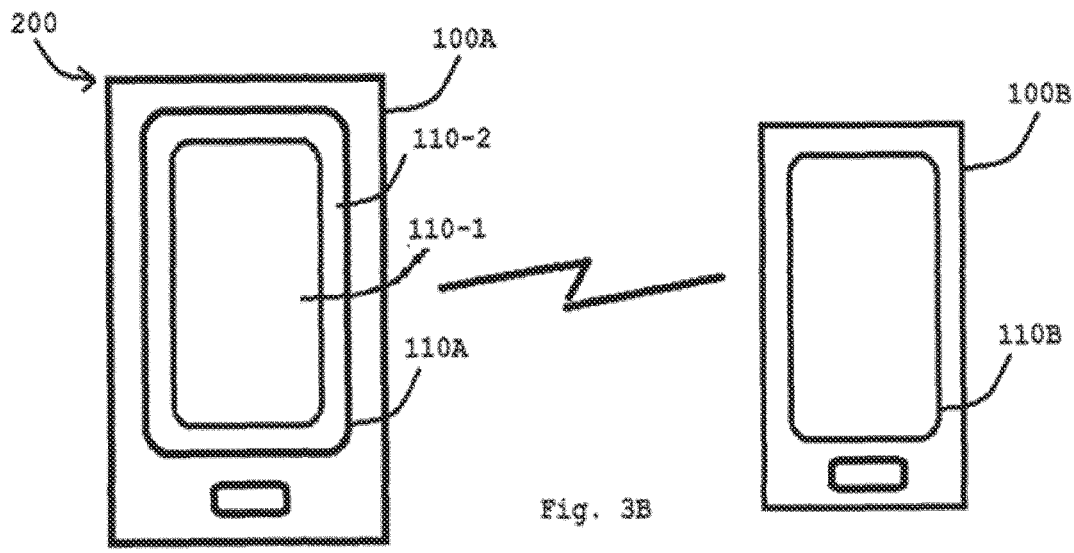
FIG. 3B shows a schematic view of an example tactile telecommunications device system according to one embodiment of the teachings of this application.

The solution will be disclosed with simultaneous reference to FIGS. 3A, 3B and 4. FIG. 3A shows a tactile telecommunications system 200 comprising a first tactile telecommunications device 100A and a second tactile telecommunications device 100B configured to operate according to an embodiment of the present invention. FIG. 4 shows a flowchart for a general method of operating the telecommunications device 100 in a manner which solves, eliminates or at least mitigates the problems and shortcomings associated with the prior art.

As is illustrated in FIG. 3A, the tactile device 110A of the first tactile telecommunications device 100A has different properties than the tactile device 110B of the second tactile telecommunications device 100B. In the illustrated example, the tactile devices 110A, 110B are tactile displays and the properties are represented by the sizes of the tactile displays 110A, 110B, the first tactile display 110A having a larger size than the second tactile display 110B.

As a first tactile telecommunications device 100A connects (or while being connected) to a second tactile telecommunications device 100B for transmitting (sending and/or receiving) tactile data, the first tactile telecommunications device 100A receives a message comprising properties of the second tactile telecommunications device 100B, such as the display size of tactile display 1101B of the second tactile telecommunications device 100B. This is performed in the connection 410.

In one embodiment, the second tactile telecommunications device 100B also receives a message comprising properties of the first tactile telecommunications device 100A, such as the display size of tactile display 110A of the first tactile telecommunications device 100A.

The first tactile telecommunications device 100A is configured to compare the received properties of the second tactile telecommunications device 100B to its own properties, data of which are stored in the memory 160, and to determine a common property, such as a smallest common denominator of the properties. This is performed in the determination 420.

In one embodiment, the second tactile telecommunications device 100B also compares the received properties of the second tactile telecommunications device 100B to its own properties, data of which are stored in the memory 160, and to determine a common property.

The first tactile telecommunications device 100A is configured to determine if any adaptation is needed and if so adapt the touch display 110A according to the common property. This is done in the determination 430 and the adaptation 440. In one embodiment, the second tactile telecommunications device 100B is also determines if any adaptation is needed and if so adapts the touch display 110A according to the common property.

It should be noted that it is not as such the tactile or touch display 110A/110B that is adapted, but the operation of the tactile or touch device. The physical appearance is thus not changed, only the operation of the display, so that the display is adapted to work with another active size or resolution as would be understood by a skilled person reading this application.

In one embodiment where the property is the size or extension of the display, the common property is the smallest size, which is then taken as an adapted size for the tactile display 110.

For the purpose of this application, the extension of a tactile display corresponds to its sizes; width×height, unless otherwise detailed, expressed as w×h, width×height.

In one embodiment, the size is expressed as a resolution of the display.

In one embodiment, the size is expressed as a physical size of the display. In such an embodiment, the resolution of the displays should also be given so that a scaling of the input may be done if the two devices are operating at different resolutions as well as sizes.

In one embodiment where the property is the size of the display, the common property is the smallest longitudinal size or height, which is then taken as an adapted longitudinal size or height for the tactile display 110, and the smallest latitudinal size or width, which is then taken as an adapted latitudinal size or width for the tactile display 110.

The determination in such embodiments whether to adapt or not is to determine if the size of the tactile display 110 of the tactile telecommunications device 100 is larger than the common property, and if so, adapt accordingly.

FIG. 3B shows how the first tactile telecommunications device 100A, having the larger display size, is adapted by only functionally activating a portion, i.e. an active area 110-1 of the tactile display 110A. An active area 110-1 will also be referred to herein as a tactile exploration area, meaning that tactile data may be explored, as in input and output within that area.

The correspondingly deactivated portion or deactivated area 110-2, which will also be referred to herein as a non-exploration area, meaning that tactile data may not be explored, as in input and output within that area, may be indicated to the user by for example changing the color and/or the texture or structure of the tactile display 110A in the deactivated area 110-2. One example is to blacken and raise the deactivated area 110-2. In one example, the exploration region or active area 110-1 is defined by a contour which may be a solid or a dashed line around the region. In another example, the non-exploration region or deactivated area 110-2 may become transparent to indicate that that region is not enabled for tactile feedback. In other embodiments, a symbol indicating if it is a tactile exploration or non-exploration region, i.e. an active or deactivated area, is displayed inside each region.

In another embodiment, the first tactile telecommunications device 100A may display a "mirrored view" of the user interface of second tactile telecommunications device 100B and vice-versa.

In another embodiment, the border between both regions may be enabled with tactile feedback so that the user can perceive the border when the user crosses it with its finger. For example, the border may provide a physical bump feeling to the user (if the device is able to change shape). In another example, the device vibrates when the user's finger crosses the border.

In another example, the border may be defined with a high friction coefficient so that the user perceives it as a border.

In other examples, when the user crosses the border, a special sound may be provided to the user.

FIG. 3B shows an indication of the active area 110-1 and the deactivated area 110-2.

By functionally deactivating a portion is herein considered to mean to disable or reject any input received in a deactivated area 110-2, that is to disregard any input received through the deactivated area and not to output any received tactile data—other than system data such as indications of borders and such. By functionally activating an area is herein considered to mean to only accept input received within that active area 110-1.

In one embodiment, the determination and adaptation is to perform a logical AND operation coordinate wise for both tactile displays, where a logical TRUE is provided if the coordinate exits in both tactile displays 110. All coordinates receiving a logical TRUE thus belong to the adapted tactile display size or active area 110-1.

In one embodiment, the determination and adaptation is to perform a logical XOR operation coordinate wise for both tactile displays, where a logical TRUE is provided if the coordinate only exits in one of the two tactile displays 110. All coordinates receiving a logical TRUE thus belong to the deactivated area 110-2.

In one embodiment, the determination and adaptation is to set the width of the active area 110-1 to be the smallest width of the tactile devices 110A, 110B of the first and the second tactile telecommunications devices 100A and 100B respectively and the height of the active area 110-1 to be the smallest height of the tactile devices 110A, 110B of the first and the second tactile telecommunications devices 100A and 100B respectively. In such an embodiment, where the orientation is to be considered, the width of a device in portrait mode is taken to be the actual width, whereas the width of a device in landscape mode is taken to be the actual height and the height of a device in landscape mode is taken to be the actual width, assuming that the device is to be used in portrait mode as the default setting, or the width of a device in portrait mode is taken to be the actual height and the height of a device in portrait mode is taken to be the actual width, if the device is to be used in landscape mode as the default setting.

In one embodiment the activated area 110-1 is centered in the tactile display 110 as part of the adaptation.

Figure 3C:
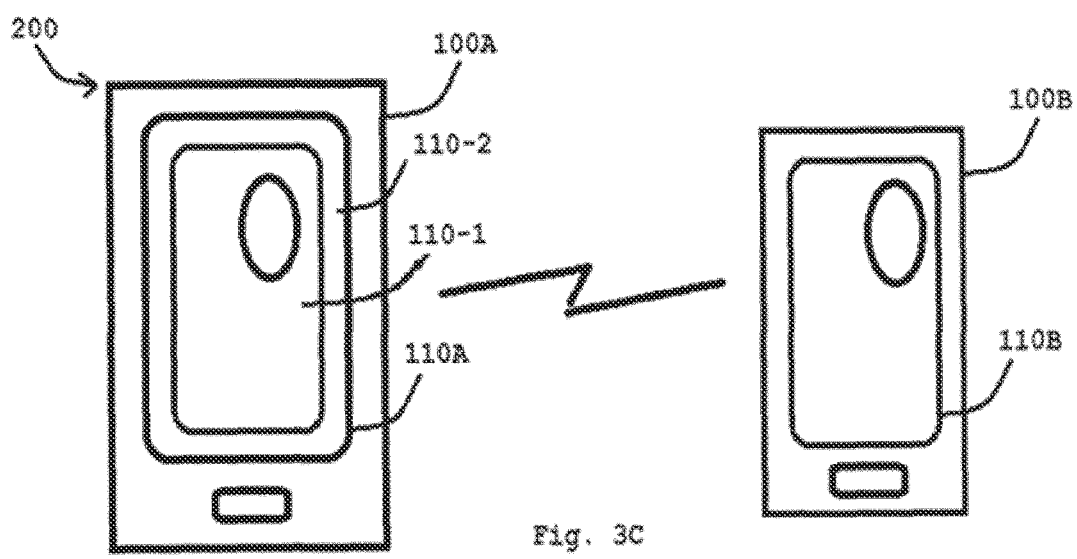
FIG. 3C shows a schematic view of an example tactile telecommunications device system according to one embodiment of the teachings of this application.

This ensures that the user of the first tactile telecommunications device 100A is only able to provide tactile data in a manner that can be purveyed to the user of the second tactile telecommunications device 100B without distorting the tactile data, see FIG. 3C where a tactile input is received and displayed by the second tactile telecommunications device 100B at the same location and at the same size as input in the first tactile telecommunications device 100A.

In one embodiment, the properties also include the currently used orientation of the tactile display 110.

Figure 5A:
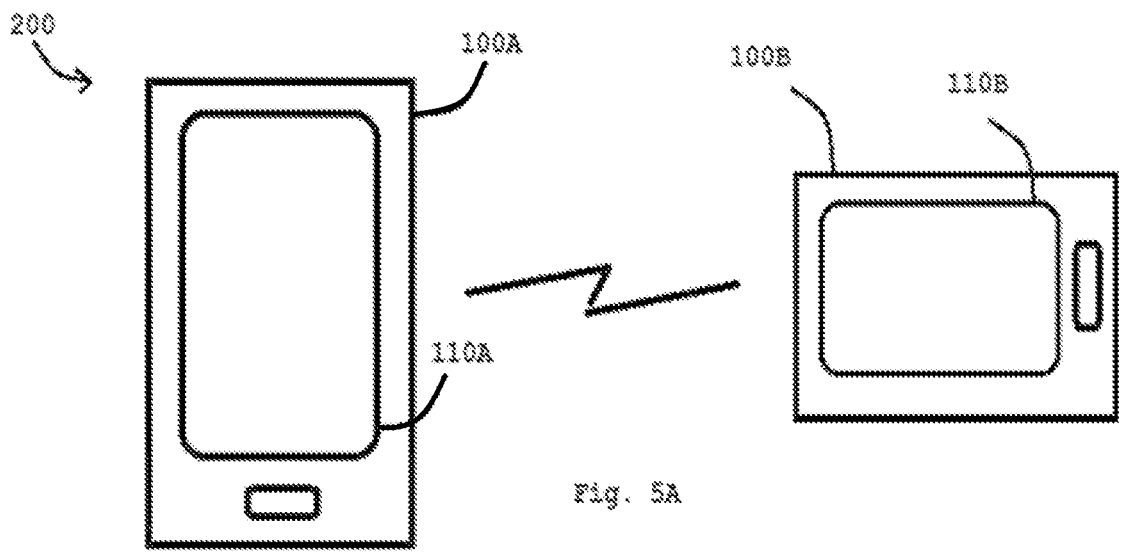
FIG. 5A shows a schematic view of an example tactile telecommunications device system according to one embodiment of the teachings of this application.

FIG. 5A shows an example where a first tactile telecommunications device 100A and a second tactile telecommunications device 100B exchange properties and adapt their tactile displays 110A,B accordingly. As can be seen, the first tactile telecommunications device 100A is in a landscape orientation and the second tactile telecommunications device 100B is in a portrait orientation.

Figure 5B:
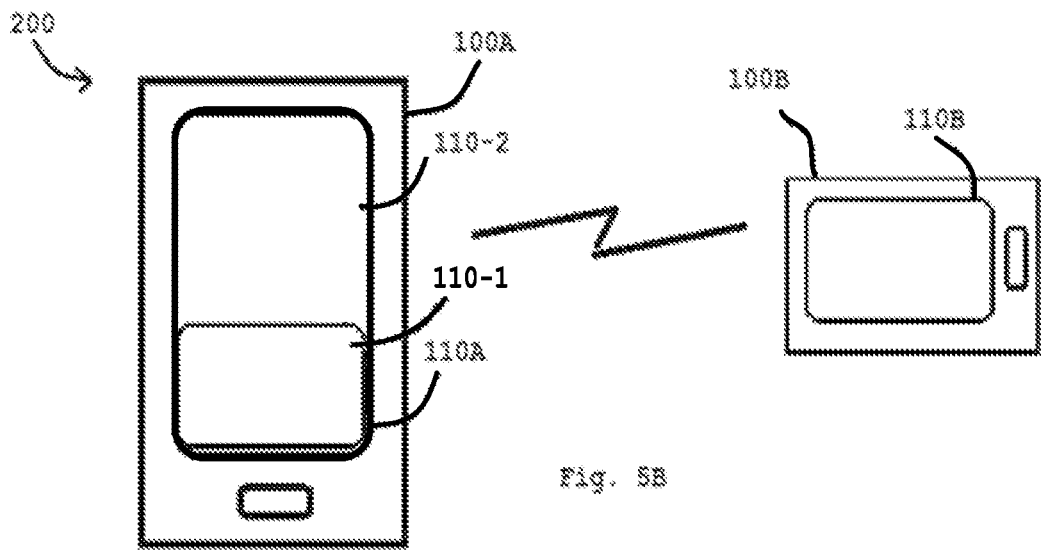
FIG. 5B shows a schematic view of an example tactile telecommunications device system according to one embodiment of the teachings of this application.

In a situation where the tactile display of the first tactile telecommunications device 100A is of a size where its longest edge is the same size or smaller than the shortest edge of the tactile display of the second tactile telecommunications device 100B, the adaptation is simply to deactivate the area engulfing the area corresponding to the area of the tactile display of the first tactile telecommunications device 100A in the tactile display of the second tactile telecommunications device 100B, see FIG. 5B.

Figure 5C:
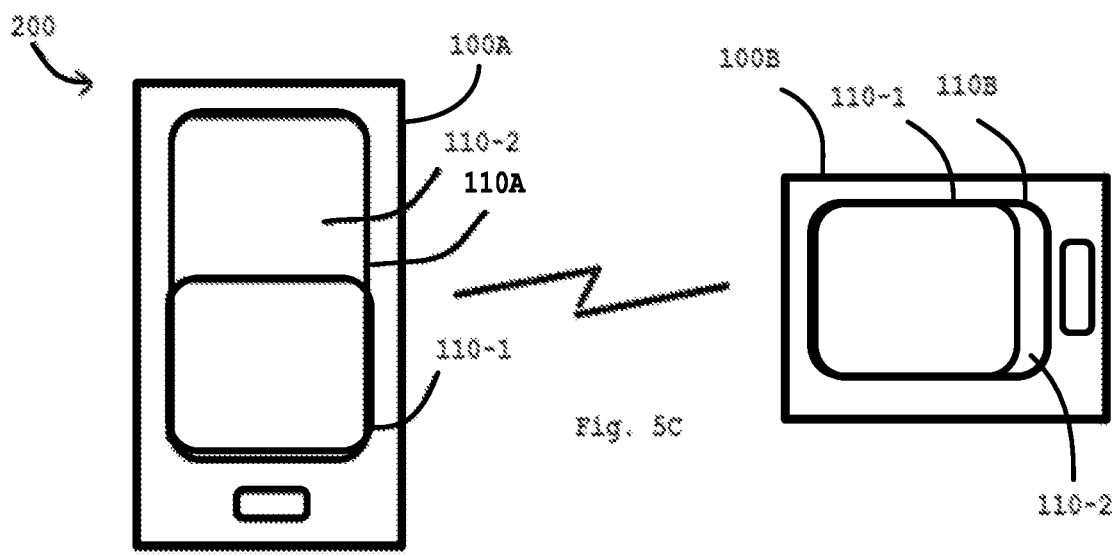
FIG. 5C shows a schematic view of an example tactile telecommunications device system according to one embodiment of the teachings of this application.

In a situation where the tactile display of the first tactile telecommunications device 100A is of a size where its longest edge is the longer than the shortest edge of the tactile display of the second tactile telecommunications device 100B, the adaptation is to deactivate the area engulfing the area corresponding to the area of the tactile display of the first tactile telecommunications device 100A in the tactile display of the second tactile telecommunications device 100B, and to deactivate the area engulfing the area corresponding to the area of the tactile display of the second tactile telecommunications device 100B in the tactile display of the first tactile telecommunications device 100A, see FIG. 5C, wherein the active area 110-1 of the second tactile telecommunications device 100B corresponds to the overlap of the tactile display 110A of the first tactile telecommunications device 100A and the tactile display 110B of the second tactile telecommunications device 100B.

Figure 6:
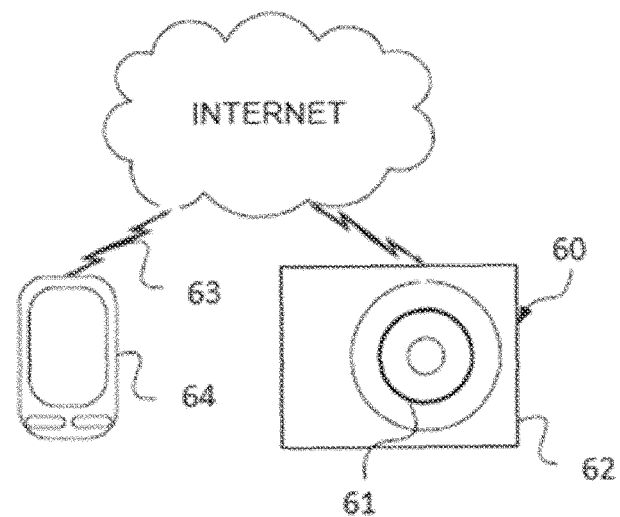
FIG. 6 shows a schematic view of a computer-readable medium according to the teachings herein.

FIG. 6 shows a schematic view of a computer-readable medium as described in the above. The computer-readable medium 60 is in this embodiment a data disc 60. In one embodiment the data disc 60 is a magnetic data storage disc. The data disc 60 is configured to carry instructions 61 that when loaded into a controller, such as a processor such as the controller 160 of the tactile telecommunications device 100 of FIGS. 1A and 1B, execute a method or procedure according to the embodiments disclosed above. The data disc 60 is arranged to be connected to or within and read by a reading device 62, for loading the instructions into the controller. One such example of a reading device 62 in combination with one (or several) data disc(s) 60 is a hard drive. It should be noted that the computer-readable medium can also be other mediums such as compact discs, digital video discs, flash memories or other memory technologies commonly used. In such an embodiment the data disc 60 is one type of a tangible computer-readable medium 60.

The instructions 61 may also be downloaded to a computer data reading device 64, such as the controller 160 or other device capable of reading computer coded data on a computer-readable medium, by comprising the instructions 61 in a computer-readable signal 63 which is transmitted via a wireless (or wired) interface (for example via the Internet) to the computer data reading device 64 for loading the instructions 61 into a controller. In such an embodiment the computer-readable signal 63 is one type of a non-tangible computer-readable medium 60. The instructions may be stored in a memory (not shown explicitly in FIG. 6, but referenced 160 in FIG. 1B) of the computer data reading device 64.

The instructions comprising the teachings according to the present invention may thus be downloaded or otherwise loaded in to a tactile telecommunications device 100 in order to cause the tactile telecommunications device 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

By utilizing the present invention, the exploration region or active area 110-1 of the first tactile telecommunications device 100A becomes the size of the tactile display of second tactile telecommunications device 100B, and second tactile telecommunications device 100B exploration region remains intact. Additionally, first tactile telecommunications device 100A now has a non-exploration region, while second tactile telecommunications device 100B has no non-exploration region. Hence, first tactile telecommunications device 100A is able to reduce its energy consumption by disabling tactile feedback in the non-exploration region.

In an additional example embodiment, the regions or areas of the tactile telecommunications device 100 where tactile feedback can be provided, i.e. the active area 110-1, is not defined by a parallelogram, but may have other shapes. In that case, additional parameters besides the length and width are to be exchanged between the devices.

In another embodiment, in the case that the tactile telecommunications device's tactile feedback capabilities are not homogeneous along the device's display, such characteristics are exchanged among the devices in order to be considered in the determination of the adaptation. This may be the case when the first tactile telecommunications device 100A device actuators are not functioning properly, or that the device screen possesses different actuators at different locations.

In some example embodiments, the pose of the devices, such as the orientation, is tracked in real-time and this data is continuously exchanged between the devices. In another embodiment, only when pose changes are detected, an updated pose/orientation is exchanged between the devices, in order to save bandwidth. In another embodiment, the pose/orientation data may be multiplexed with the tactile data, or it may be transmitted in a separate data channel.

In an additional embodiment, the tactile exploration and non-exploration areas may be further defined by considering the user and the application. In an example, the tactile exploration area is defined solely for areas which the user usually utilizes. In another example, the area may be defined according to the way the user places his/her hand and fingers on the device, since because of this position, some areas will typically not be utilized by the user since they are hard to reach.

In another example, the tactile exploration area may be defined according to the application which is running in the device. If the user is playing a game in the handheld device, only the areas where the user is currently active may be enabled as tactile exploration areas. In other examples, a prediction may be made on which areas the user will want to explore in the near future, and those areas may be also enabled for tactile exploration.

In such embodiments, the size of the active area of each device is exchanged between the devices, the size of the active area 110-1 thus representing or actively acting as the size of the display 110.

In additional embodiments, the definition of the tactile exploration and non-exploration regions with respect to the pose/orientation measurements may be turned off by the user or by the application running on the device.

As mentioned above, in some example embodiments, the tactile sensing (to detect the user touch) in the tactile feedback regions may be disabled in the non-exploration regions when the users are interacting. This saves additional energy.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A haptic telecommunications device, the haptic telecommunications device comprising:
   a haptic device having a haptic display configured to perform sensing of haptic information produced by a user interaction with the haptic display and to perform outputting, on the haptic display, of other haptic information, said haptic device being associated with first haptic device properties including a display size of the haptic display, wherein the haptic display has a plurality of coordinate locations, and wherein haptic data that is produced by or supplied to the haptic display comprises coordinate location information and touch information;
   a communications interface configured for establishing a connection with a second haptic telecommunications device, said second haptic telecommunications device being configured to perform one or both of sending and receiving haptic data and comprising a second haptic device being associated with second haptic device properties including a display size of a haptic display of the second haptic device;
   a memory configured for storing said first haptic device properties; and
   a controller configured to:
      receive said second haptic device properties;
      use the first haptic device properties and the second haptic device properties to determine a common set of coordinate locations by comparing said display size of the haptic display of said haptic device and said display size of the haptic display of said second haptic device; and
      determine whether an adaptation is required, and when the adaptation is required, adapt the haptic device by deactivating an area that does not lie within the common set of coordinate locations, thereby disabling the deactivated area from performing sensing of haptic information produced by a user interaction within the deactivated area after said adaptation and from performing outputting, within the deactivated area, of other haptic information having coordinate locations within the deactivated area and obtained by the haptic device after said adaptation, and maintaining an active area within the common set of coordinate locations for performing sensing of haptic information produced by a user interaction within the active area after said adaptation and for performing outputting, within the active area, of other haptic information having coordinate locations within the active area and obtained by the haptic device after said adaptation,
   wherein the controller is further configured to:
      receive user-entered haptic data derived from sensing a user interaction within the active area; and
      communicate the user-entered haptic data to the second haptic telecommunications device for output on the second haptic device.

2. The haptic telecommunications device as defined in claim 1, wherein said communication interface is also configured to transmit said first haptic device properties for said haptic device to said second haptic telecommunications device.

3. The haptic telecommunications device as defined in claim 1,
   wherein the active area corresponds to a smallest display size of the size of the haptic display and display size of the second haptic display.

4. The haptic telecommunications device as defined in claim 1, wherein the active area corresponds to an overlap of the display size of the haptic display and display size of the second haptic display.

5. The haptic telecommunications device as defined in claim 1, wherein the first haptic device properties includes an orientation of the corresponding haptic display and wherein the controller is further configured to adapt the haptic display based at least in part on the orientation of the corresponding haptic display.

6. The haptic telecommunications device of claim 1, wherein the haptic telecommunications device is comprised in a system that further comprises the second haptic telecommunications device.

7. A method of controlling a haptic telecommunications device, the haptic telecommunications device comprising a first haptic device having a first haptic display for sensing haptic information produced by a user interaction with the first haptic display and for outputting, on the first haptic display, other haptic information, said first haptic device being associated with first haptic device properties including a display size of the first haptic display, wherein the first haptic display has a plurality of coordinate locations, and wherein the haptic data that is produced by or supplied to the first haptic display comprises coordinate location information and touch information; wherein the method comprises:

receiving, from a second tactile telecommunications device, second haptic device properties for a second haptic device, wherein the received second haptic device properties include a display size of a second haptic display of the second haptic device;

using the first haptic device properties and the second haptic device properties to determine a common set of coordinate locations by comparing said display size of the first haptic display of said first haptic device and said display size of the second haptic display of said second haptic device; and determining whether an adaptation is required, and when the adaptation is required, adapting the first haptic device by deactivating an area that does not lie within the common set of coordinate locations, thereby disabling the deactivated area from sensing haptic information produced by a user interaction within the deactivated area after said adaptation and from outputting, within the deactivated area, other haptic information having coordinate locations within the deactivated area and obtained by the first haptic device after said adaptation, and maintaining an active area within the common set of coordinate locations for sensing haptic information produced by a user interaction within the active area after said adaptation and for outputting, within the active area, other haptic information having coordinate locations within the active area and obtained by the first haptic device after said adaptation, wherein the method further comprises:
receiving user-entered haptic data derived from sensing a user interaction within the active area; and
communicating the user-entered haptic data to the second haptic telecommunications device for output on the second haptic device.

8. A non-transitory computer readable storage medium comprising instructions that, when executed on a processor, perform a method of controlling a haptic telecommunications device, the haptic telecommunications device comprising a first haptic device having a first haptic display for sensing haptic information produced by a user interaction with the first haptic display and for outputting, on the first haptic display, other haptic information, said first haptic device being associated with first haptic device properties including a display size of the first haptic display, wherein the first haptic display has a plurality of coordinate locations, and wherein the haptic data that is produced by or supplied to the first haptic display comprises coordinate location information and touch information; wherein the method comprises:

receiving second haptic device properties for a second haptic device, wherein the received second haptic device properties include a display size of a second haptic display of the second haptic device;

using the first haptic device properties and the second haptic device properties to determine a common set of coordinate locations by comparing said display size of the first haptic display of said first haptic device and said display size of the second haptic display of said second haptic device; and determining whether an adaptation is required, and when the adaptation is required, adapting the first haptic device by deactivating an area that does not lie within the common set of coordinate locations, thereby disabling the deactivated area from sensing haptic information produced by a user interaction within the deactivated area after said adaptation and from outputting, within the deactivated area, other haptic information having coordinate locations within the deactivated area and obtained by the first haptic device after said adaptation, and maintaining an active area within the common set of coordinate locations for sensing haptic information produced by a user interaction within the active area after said adaptation and for outputting, within the active area, other haptic information having coordinate locations within the active area and obtained by the first haptic device after said adaptation, wherein the method further comprises:
receiving user-entered haptic data derived from sensing a user interaction within the active area; and
communicating the user-entered haptic data to the second haptic telecommunications device for output on the second haptic device.

* * * * *